Jan. 17, 1956  A. Y. DODGE  2,731,122
ONE WAY CLUTCHES
Filed April 10, 1951
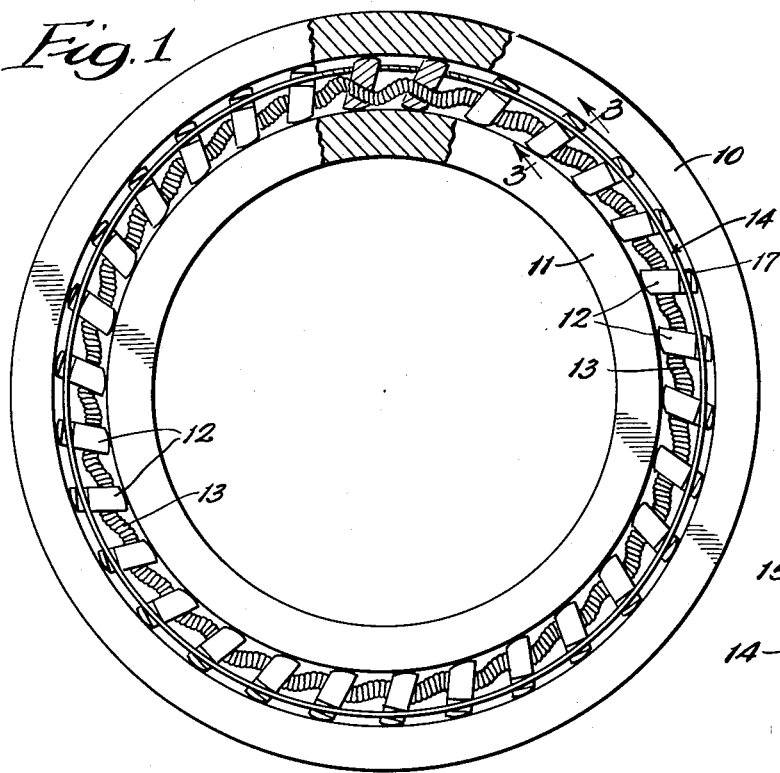
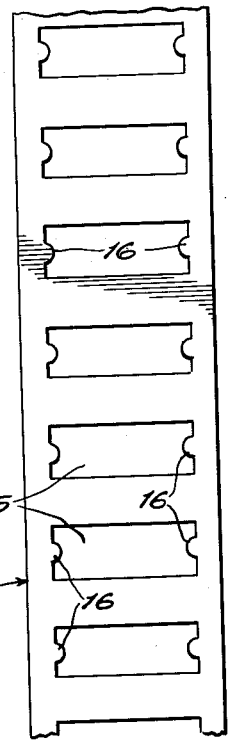
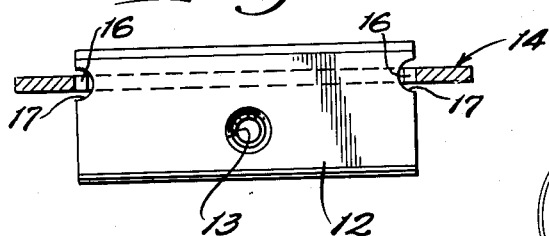
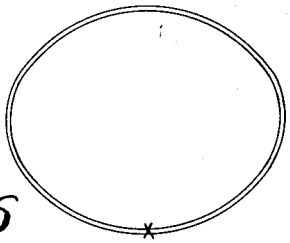
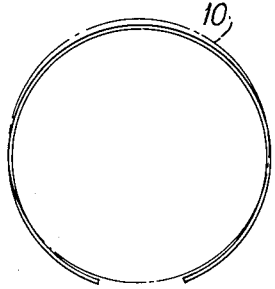
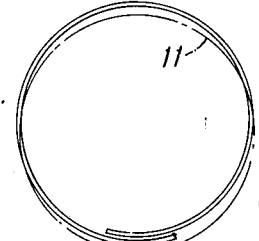
INVENTOR:
Adiel Y. Dodge,
BY
E. S. Booth,
ATTORNEY.

United States Patent Office 2,731,122
Patented Jan. 17, 1956

2,731,122

ONE WAY CLUTCHES

Adiel Y. Dodge, Rockford, Ill., assignor to Borg-Warner Corporation, Chicago, Ill., a corporation of Illinois Application April 10, 1951, Serial No. 220,250

8 Claims. (Cl. 192—45.1)

This invention relates to one-way clutches, and more particularly to one-way clutches of the tilting gripper type.

In one-way clutches it is desirable to provide a cage to hold the grippers assembled in properly spaced relation, and to assist in controlling the tilting thereof. The present invention relates primarily to a cage construction to accomplish these purposes.

It is one of the objects of the invention to provide a one-way clutch in which the cage is extremely simple and inexpensive in construction and co-operates effectively with the grippers to hold them properly assembled and to assist in controlling tilting thereof.

Another object is to provide a one-way clutch in which the grippers can easily be assembled into the cage and will be securely held therein in a permanent or semi-permanent assembly without the use of separate fastening units.

According to one feature, the grippers are first assembled on an annular tilting spring and the gripper and spring subassembly is then assembled with the cage.

A further object is to provide a one-way clutch in which the cage will not interfere with normal tilting action of the spring, but is so constructed as to limit tilting of the grippers to prevent damage to the spring.

The above and other objects and features of the invention will be more readily apparent from the following description when read in connection with the accompanying drawing, in which:

Figure 1 is a side elevation of an assembled one-way clutch embodying the invention, with parts in section; Figure 2 is a developed plan view of the cage, and Figure 3 is a section on the line 3—3 of Figure 1; Figure 4 discloses one form of cage embodying the present invention; Figure 5 discloses another form of cage embodying the present invention; Figure 6 discloses a different form of cage embodying the present invention.

The clutch as shown in Figure 1 is adapted to connect an outer cylindrical race 10 with a coaxial inner race 11, both races having facing cylindrical surfaces. The clutch comprises a series of tiltable grippers 12 in annular array between the races. The grippers are of the type having their ends curved about spaced centers so that when they tilt in one direction they will engage and grip the race surfaces while, when they tilt in the other direction, they will disengage the race surfaces to allow free relative rotation. In the illustrated clutch the outer race can turn clockwise relative to the inner race, but will be held against relative counterclockwise rotation.

The grippers are formed with central openings therethrough to receive an annular coil spring 13 which is threaded through the openings and which is normally bent so that it urges the grippers to tilt counterclockwise into engagement with the race surfaces. This construction is more particularly described and claimed in the patent to Swenson, No. 2,386,013.

According to the present invention the grippers are held assembled in properly spaced relation by a cage indicated generally at 14. The cage is formed of a flat strip preferably of resilient metal which, as best seen in Figure 2, is formed with a series of transversely extending openings 15 through which the grippers can extend. In forming the cage a continuous flat strip of suitable material may be punched and cut to the required length for the particular clutch and rolled into an annulus. The grippers may then be inserted through the openings 15 from the inside of the annulus so that the spring 13 will lie radially inward of the cage as shown.

In order to hold the grippers in assembled position and to assist in controlling tilting thereof the edge portions of the cage strip at the ends of the openings are formed with inwardly extending lips 16. These lips are adapted to project into transverse grooves 17 in the ends of the grippers, as best seen in Figure 3. It will be noted that the lips 16 fit loosely in the grooves so that the grippers can have a free limited tilting motion.

In assembling the grippers they may be forced radially outward through the openings in the cage. During this operation the lips or ears 16 may be bent outward but will spring back at least partially into the grooves 17. After this has occurred the grippers may be pressed inward to bend the lips 16 back to the straight position illustrated, where they will fit into the grooves to limit both radial and tilting movement of the grippers.

For some types of clutches it is desirable to connect the ends of the cage strip rigidly, as by welding, so that it forms a complete annulus. Preferably when this is done the cage is bent slightly out of round so that some of the grippers will be pressed frictionally against the outer race and others against the inner race. This produces a friction drag of the grippers on the race surfaces during overrunning and assists in causing rapid engagement of the clutch when the direction of rotation is reversed. A cage of this type, prior to its assembly with the other elements of the clutch, is disclosed in Figure 4.

In other cases the ends of the cage strip may be left disconnected and the strip may be bent to a size such that it will resiliently press all of the grippers into engagement with one or the other of the races. For some conditions it may be preferable to have the grippers engage the inner race so that they will tend to be tilted by the friction between their inner ends and the inner race; a cage for accomplishing this is disclosed in Figure 6, which also illustrates the gripper engaging surface of the inner race so that the relationship between that race and this type of cage prior to assembly of the parts will be obvious. Under other conditions it may be preferable for the grippers to engage the outer race to be controlled by friction between the outer ends and the outer race. In either case the desired action of the grippers can easily be obtained; a cage for accomplishing this is illustrated in Figure 5 which also shows the gripper engaging surface of the outer race so that the relationship between this type of cage and the outer race prior to the assembly is obvious.

It will be seen that the cage of the present invention is formed very simply and inexpensively and that cages of different sizes can easily be formed from lengths of a continuous punched strip. The cage when completed is extremely compact and light in weight, but at the same time holds the grippers securely assembled and limits tilting thereof so that the spring will not be damaged by excessive tilting during overrunning, and so that quick reversals in torque can be accommodated.

While certain embodiments of the invention have been shown and described in detail, it will be understood that this is not to be taken as a definition of the scope of the invention, reference being had for this purpose to the appended claims.

What is claimed is:

1. A one-way clutch comprising a plurality of tiltable grippers adapted to fit between coaxial ring surfaces and having transverse grooves in their ends, and a cage formed of a flat strip with a series of spaced openings between the sides thereof through which the grippers extend and bent into annular form to fit between the race surfaces, and integral inwardly projecting lugs on the sides of the strip to fit loosely in the grooves in the ends of the grippers and engageable with the sides of the grooves to limit both radial and tilting movements of the grippers relative to the cage.

2. A one-way clutch comprising a plurality of tiltable grippers adapted to fit between coaxial ring surfaces and having transverse grooves in their ends, and a cage formed of a flat strip with a series of spaced openings between the sides thereof through which the grippers extend and bent into annular form to fit between the race surfaces, and integral inwardly projecting lugs on the side of the strip to fit loosely in the grooves in the ends of the grippers and engageable with the sides of the grooves to limit both radial and tilting movements of the grippers relative to the cage, the cage strip having its ends separated and being radially resilient to urge the grippers yieldingly toward one of the race surfaces.

3. A one-way clutch comprising a plurality of tiltable grippers adapted to fit between coaxial ring surfaces and having transverse grooves in their ends, and a cage formed of a flat strip with a series of spaced openings between the sides thereof through which the grippers extend and bent into annular form to fit between the race surfaces, and integral inwardly projecting lugs on the sides of the strip to fit loosely in the grooves in the ends of the grippers and engageable with the sides of the grooves to limit both radial and tilting movements of the grippers relative to the cage, the cage being slightly oval resiliently to urge certain of the grippers radially outward and others radially inward.

4. A one-way clutch adapted to be mounted between coaxial races comprising a series of tiltable grippers in annular array to be mounted between races, an annular spring threaded through the grippers and tending to tilt them in a direction to grip the races, and a cage formed of a flat strip bent into an annulus and having spaced openings between the sides thereof through which the grippers extend, and integral lugs projecting into the ends of the openings from the sides of the strip, the ends of the grippers being formed with transverse grooves loosely to receive the lugs the sides of the grooves being engageable with the lugs to limit both radial and tilting movement of the grippers relative to the cage.

5. A one-way clutch adapted to be mounted between coaxial races comprising a series of tiltable grippers in annular array to be mounted between races, an annular spring threaded through the grippers and tending to tilt them in a direction to grip the races, and a cage formed of a flat strip bent into an annulus and having spaced openings between the sides thereof through which the grippers extend, the ends of the grippers being formed with transverse grooves to receive side portions of the strip at the ends of the openings the sides of the grooves being engageable with said side portions of the strip to limit both radial and tilting movement of the grippers relative to the cage.

6. A one-way clutch adapted to be mounted between coaxial races comprising a series of tiltable grippers in annular array to be mounted between races, an annular spring threaded through the grippers and tending to tilt them in a direction to grip the races, and a cage formed of a flat strip bent into an annulus and having spaced openings between the sides thereof through which the grippers extend, the ends of the grippers being formed with transverse grooves, and integral lugs narrower than the width of the openings extending inward from the sides of the strip and fitting loosely in the grooves the side of the grooves being engageable with the lugs to limit both radial and tilting movement of the grippers relative to the cage.

7. A one-way clutch adapted to be mounted between coaxial races comprising a series of tiltable grippers in annular array to be mounted between races, an annular spring threaded through the grippers and tending to tilt them in a direction to grip the races, and a cage formed of a flat strip bent into an annulus and having spaced openings between the sides thereof through which the grippers extend, the ends of the grippers being formed with transverse grooves, and integral lugs narrower than the width of the openings extending inward from the sides of the strip and fitting loosely in the grooves the sides of the grooves being engageable with the lugs to limit both radial and tilting movement of the grippers relative to the cage, the ends of the strip being separated and the strip being radially resilient to urge the grippers toward one of the races.

8. A one-way clutch adapted to be mounted between coaxial races comprising a series of tiltable grippers in annular array to be mounted between races, an annular spring threaded through the grippers and tending to tilt them in a direction to grip the races, and a cage formed of a flat strip bent into an annulus and having spaced openings between the sides thereof through which the grippers extend, the ends of the grippers being formed with transverse grooves, and integral lugs narrower than the width of the openings extending inward from the sides of the strip and fitting loosely in the grooves the sides of the grooves being engageable with the lugs to limit both radial and tilting movement of the grippers relative to the cage, the ends of the strip being secured together and the strip being oval to urge certain of the grippers radially outward and others radially inward.

References Cited in the file of this patent

UNITED STATES PATENTS

| | | |
|---|---|---|
| 2,010,885 | Osterholm | Aug. 13, 1935 |
| 2,342,227 | Swenson | Feb. 22, 1944 |
| 2,366,843 | Dodge et al. | Jan. 9, 1945 |
| 2,386,013 | Swenson | Oct. 2, 1945 |
| 2,428,962 | Davis | Oct. 14, 1947 |
| 2,542,914 | Farkas et al. | Feb. 20, 1951 |